United States Patent
Burga et al.

[11] Patent Number: 5,980,369
[45] Date of Patent: Nov. 9, 1999

[54] LEVEL FLYING BURNISHING HEAD WITH CIRCULAR BURNISHING PADS

[75] Inventors: Margelus A. Burga, San Jose; Alexander A. Burga, Santa Clara, both of Calif.

[73] Assignee: Marburg Technology, Inc., Milpitas, Calif.

[21] Appl. No.: 08/837,159

[22] Filed: Apr. 14, 1997

[51] Int. Cl.⁶ ............................................. B24B 5/00
[52] U.S. Cl. ............................................. 451/317; 451/290
[58] Field of Search ........................... 451/317, 63, 103, 451/318, 901, 312, 324, 552, 555, 557, 558, 290, 146, 183, 258, 246, 254, 548, 28; 29/90.01

[56] References Cited

U.S. PATENT DOCUMENTS

| | | | |
|---|---|---|---|
| 3,486,274 | 12/1969 | David | 451/548 |
| 3,943,666 | 3/1976 | Dion et al. | 451/254 |
| 4,241,368 | 12/1980 | Tadokoro et al. | 360/128 |
| 4,330,910 | 5/1982 | Schachl et al. | 29/90 R |
| 4,412,400 | 11/1983 | Hammond | 451/163 |
| 4,430,782 | 2/1984 | Bornhorst et al. | 29/90 |
| 4,731,957 | 3/1988 | Weisinger | 451/558 |
| 4,845,816 | 7/1989 | Nanis | 29/90.01 |
| 5,063,712 | 11/1991 | Hamilton et al. | 451/173 |
| 5,086,360 | 2/1992 | Smith et al. | 360/103 |
| 5,423,111 | 6/1995 | Mori | 29/90.01 |
| 5,658,191 | 8/1997 | Brezoczky | 451/312 |
| 5,782,680 | 7/1998 | Pilsan | 451/317 |

FOREIGN PATENT DOCUMENTS

| | | | |
|---|---|---|---|
| 54-80728 | 6/1979 | Japan | G11B 5/60 |
| 59-81058 | 5/1984 | Japan | B24B 39/00 |
| 60-249569 | 12/1985 | Japan | |

OTHER PUBLICATIONS

Harker, et al., "Burnishing Tool For Flexible Disks With Chromium Dioxide Coatings", IBM Technical Disclosure Bulletin, vol. 20, No. 3, pp. 1146–1147 (Aug. 1977).

Hopkins, et al., "Slider Mounted Burnishing Tool", IBM Technical Disclosure Bulletin, vol. 17, No. 10, p. 3010, (Mar. 1975).

Slindee, "Burnishing Method And Apparatus For Flexible Magnetic Disks", IBM Technical Disclosure Bulletin, vol. 19, No. 10, pp. 3829–3830 (Mar. 1977).

*Primary Examiner*—David A. Scherbel
*Assistant Examiner*—Derris Holt Banks
*Attorney, Agent, or Firm*—Skjerven, Morrill, MacPherson, Franklin & Friel LLP; Michael J. Halbert

[57] ABSTRACT

A burnishing head for burnishing the surface of magnetic or magneto-optical memory disks is described. The burnishing head comprises a plurality of curved burnishing pads symmetrically arranged on the bottom surface of the head. In one embodiment, there are thirteen circular burnishing pads symmetrically arranged on the bottom surface of a square burnishing pad in such a way that there is no dedicated leading edge of the burnishing head. The area between the curved burnishing pads is wide enough to allow the free flow of air to help the escape of debris created during burnishing. The burnishing head has no tapered leading edge. The burnishing pad flies parallel to the surface of the disk in a level manner, such that all burnishing pads are simultaneously used.

21 Claims, 7 Drawing Sheets

LEVEL FLYING BURNISHING HEAD WITH CIRCULAR BURNISHING PADS

FIELD OF THE INVENTION

This invention relates to a burnishing head used to burnish the surface of magnetic or magneto-optical memory disks to remove defects such as asperities and contamination.

BACKGROUND OF THE INVENTION

Typical memory disks comprise a substrate plated with a hard material such as a nickel phosphorus alloy. The nickel phosphorus is then "textured" (i.e., roughened). An underlayer, a magnetic alloy or magneto-optical material, and a protective overcoat are then deposited on the nickel phosphorus, e.g., by sputtering. The memory disk manufacturing process leaves the surface of the disk in a slightly roughened condition often with asperities, voids, or contamination.

A memory disk, such as the type used in a computer hard disk drive, is generally mounted on a spindle driven by a motor to rotate the disk at high speed. A read/write head, kept in close proximity to the surface of the rotating disk, reads or writes data on the disk. The read/write head is separated from the disk surface by an air bearing created by the high speed rotation of the disk. The read/write head flies on this air bearing, e.g., at a height of approximately one microinch, although this height is getting lower with advancing technology. The closer the read/write head is to the disk surface, the more information that may be written on the disk. Thus, it is desirable for the read/write head to fly as close as possible to the disk.

The precision with which the read/write head flies over the memory disk requires that care is taken during manufacturing of the disk to assure that there are no asperities or contamination on the surface of the disk that are large enough to interfere with the read/write head. If a defect on the disk surface contacts the read/write head during use, the read/write head or the disk may be damaged. To prevent undesired contact between the read/write head and the disk, it is important to remove from the disk surface any defects that are large enough to interfere with the read/write head.

A "burnishing head" is used in magnetic disk or magneto-optical disk manufacturing to remove asperities or contamination from the disk surface that may interfere with the read/write head. An example of a burnishing head is described in U.S. Pat. No. 4,845,816.

Burnishing heads use rhomboid or diamond shaped pads. FIG. 1 shows an enlarged view of the bottom surface of a burnishing head 2 with a plurality of burnishing pads 4. Each burnishing pad 4 is diamond shaped and has sharp edges 6 and 8. Edges 6 and 8 contact and cut protrusions on the memory disk surface as the disk rotates beneath burnishing head 2. Burnishing head 2 also has a tapered leading edge 10. FIG. 2A illustrates burnishing head 2 attached to a suspension arm 13 over the surface of a disk 14, which is rotating in the direction of arrow 16. The high speed rotation of disk 14 creates an air cushion or bearing over the surface of disk 14. Lift is created under burnishing head 2 when the air bearing contacts tapered leading edge 10 and the large air bearing surface area, which is formed by the bottom of pads 4.

As shown in FIG. 2A, burnishing head 2 flies over the surface of disk 14 at a slope angle θ, approximately 0.015 degrees. Because burnishing head 2 flies at angle θ, any contact between burnishing head 2 and the surface of disk 14 is primarily at the trailing edge 18. Thus, trailing edge 18 wears down more quickly then the rest of burnishing head 2. As shown in FIG. 2A, the trailing edge 18 is a distance $d_{d1}$ above disk 14 and the leading edge 10 is a distance $d_{d2}$ above disk 14, where $d_{d1}$ is less than $d_{d2}$ because burnishing head is at an angle θ. FIG. 2B shows a burnishing head 3 that has been worn with use. As shown in FIG. 2B, worn burnishing head 3 flies at the same angle θ. The leading edge 10 of burnishing head 3 is a distance $d_{d4}$ from disk 14, which is the same height as distance $d_{d2}$ as shown in FIG. 2A. However, the trailing edge 18 of worn burnishing head 3 has been worn away. Thus, distance $d_{d3}$ of trailing edge 18 in FIG. 2B is greater than distance $d_{d1}$ in FIG. 2A. Accordingly, worn burnishing head 3 is less effective than burnishing head 2.

Also, burnishing head 2 sometimes rolls as it flies over the surface of disk 14. Any roll of burnishing head 2 will cause a corner on trailing end 18 to contact the surface of disk 14, which may result in scratching, gouging or other damage to disk 14.

Burnishing head 2 has channels 12, which separate diamond pads 4 from each other. Channels 12 are intended to accept debris as protrusions are cut from the surface of disk 14. However, debris tends to accumulate in channels 12. With the accumulation of debris in channels 12, debris contamination may be spread to other parts of the memory disk, as well as to other memory disks upon which the burnishing head is subsequently used. The accumulated debris may gouge or otherwise damage areas of the memory disk which the debris contacts. Debris accumulation is caused by the straight sides of channels 12 disrupting and reflecting air flow through channels 12 during use of burnishing head 2. Also, there is generally some residue remaining from the burnishing head manufacturing process in channels 12. Due to the small size of channels 12, typically 0.0045 inches across, it is difficult to clean channels 12 of all manufacturing residue. Thus, once debris from the cut protrusions is swept into the channels 12, the debris tends to accumulate within the channels due to the residue already present in channels 12 and the lack of air flow through channels 12.

FIG. 3A is a graph showing the performance of an unused 70%, 4.5 mil diamond pad burnishing head. The term "70%" describes the size of the burnishing head and is understood by those skilled in the art. The term "4.5 mil" refers to the width of the channels 12 between diamond pads 4. The vertical axis is the average hit voltage determined by a glider head. (A glider head is a test head used to test a disk for the presence of asperities and voids on the disk surface. A glider head provides an output "hit voltage" indicative of the size of the asperity or void encountered.) The horizontal axis is the test radii of the disks tested. The line with diamond data points is the average hit voltages of five disks before burnishing. The line with square data points represents the average hit voltage of the same five disks after two passes with diamond pad burnishing head. FIG. 3B is a graph similarly depicting the performance of the same burnishing head after eight hours of continuous use. FIG. 3B also depicts the initial average hit voltages of five unburnished disk and the average hit voltages on the same disks after two passes with the used diamond pad burnishing head. The used diamond pad burnishing head damaged the disks at the radii 1340 and 740 as illustrated by the 2-pass data line having a higher hit voltage than the initial data line.

As shown in FIG. 1, burnishing head 2 is asymmetrical. Diamond pads 4 are intended to travel over the surface of disk 14 in a specific direction, such that any protrusions on the surface of disk 14 meet cutting edges 6 and 8 of diamond pads 4 at the greatest oblique angle possible. In other words, each protrusion should be sliced from one side to the other by cutting edge 6 or 8, rather than confronted all at once by cutting edge 6 or 8. Tapered edge 10 further limits the direction of travel of burnishing head 2 relative to disk 14 because tapered edge 10 is the leading edge as illustrated in FIG. 2.

FIGS. 4A and 4B illustrate the alignment of prior art burnishing heads 2A and 2B when mounted to a suspension arm 13 over disk 14 rotating in the direction of arrow 18. FIG. 4A shows burnishing head 2A mounted to suspension arm 13 such that burnishing head 2A is in a transverse direction relative to suspension arm 13. Thus, burnishing head 2A is known as a "transverse" burnishing head. FIG. 4B shows burnishing head 2B mounted to suspension arm 13 such that burnishing head 2B is in line with suspension arm 13. Thus, burnishing head 2B is known as an "in-line" burnishing head. The way in which burnishing heads 2A or 2B are mounted to suspension arm 13 depends on the alignment of diamond pads 4 (in phantom lines in FIGS. 4A and 4B) and which edge is the tapered leading edge 10 (FIG. 1). As discussed above, cutting edges 6 and 8 of diamond pads 4 are more efficient if they meet asperities 20 at the greatest angle possible. If burnishing heads 2A and 2B are incorrectly mounted to suspension arm 13, cutting edges 6 and 8 will not contact asperities 20 at the desired angle. Thus, care is required during manufacturing so that diamond pads 4 are positioned correctly on burnishing heads 2A and 2B and also in the mounting of burnishing heads 2A and 2B to suspension arm 13 so that burnishing heads 2A and 2B are facing the correct direction relative to suspension arm 13. Accordingly, a universal burnishing head is needed that eliminates the need to determine whether the head is a transverse or in-line burnishing head and which edge is the leading edge.

SUMMARY

A burnishing head in accordance with our invention includes a plurality of pads that have a curved geometry and are arranged symmetrically on the bottom surface of the burnishing head. The pads are curved to aid in the flow of air between the pads and to help prevent the accumulation of debris against the pads. Thus, debris may freely escape beneath the burnishing head, thereby avoiding contaminating different areas of the magnetic disk and other magnetic disks with accumulated residue.

In one embodiment, the burnishing head has thirteen circular burnishing pads on the bottom surface of a square burnishing head are symmetrically arranged about the point of suspension. The burnishing head does not have a tapered leading edge. Because there is no tapered leading edge and the pads are symmetrically arranged, the burnishing head flies level, i.e., parallel to the memory disk. Accordingly, all burnishing pads are used simultaneously, which evenly distributes wear on all the burnishing pads. The even wear of the burnishing pads increases the durability of the burnishing head.

The burnishing head is symmetrical which eliminates problems encountered during manufacturing and mounting of the burnishing head, such as the problem of determining which direction the burnishing head must face relative to the rotation of the surface of the memory disk. The symmetry of the burnishing head also aids maintaining level flight over the disk. Thus, the burnishing head is a universal burnishing head that may be used as either a transverse burnishing head or an in-line burnishing head.

DETAILED DESCRIPTION

Figure 5A:
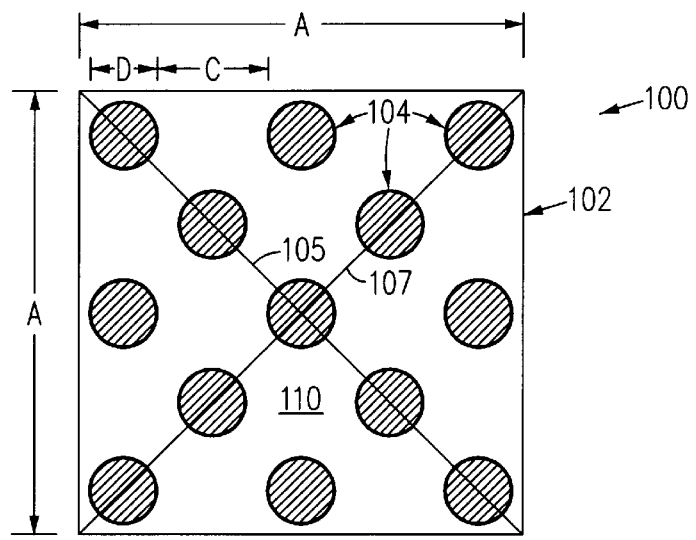
FIGS. 5A and 5B are bottom plan and side views, respectively, of a burnishing head in accordance with the invention.
Figure 5B:
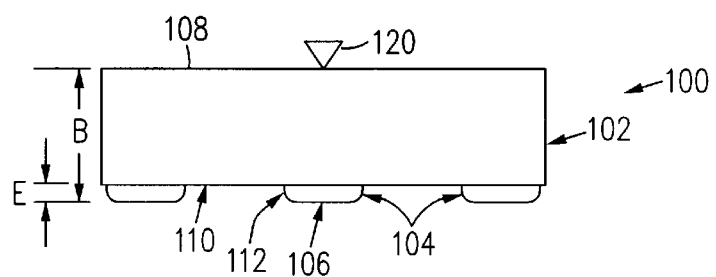

FIGS. 5A and 5B illustrate an embodiment of a burnishing head 100 in accordance with the invention. FIG. 5A is the bottom view of burnishing head 100. FIG. 5B is a side view of burnishing head 100. Burnishing head 100 comprises a body 102 and a plurality of burnishing pads 104. Body 102 of burnishing head 100 is symmetrical about the orthogonal axes 105, 107 (shown in FIG. 5A) about the point of contact with suspension arm 120, as shown in FIG. 5B. For instance body 102 may be square or round, although body 102 may be other shapes if the point of contact with suspension arm 120 is moved to compensate for the weight distribution. Body 102 is approximately 0.078 inches by 0.078 inches (distance A in FIG. 5A) and approximately 0.035 inches in height from the burnishing surface 106 of burnishing pads 104 to an upper surface 108 of body 102 (distance B in FIG. 5B). The physical dimensions are merely by way of example, and do not limit the scope of the invention. The invention may be embodied in burnishing heads of other sizes.

There are thirteen substantially circular burnishing pads 104 on burnishing head 100. It is understood, however, that the number and the shape of burnishing pads 104 may differ. Burnishing pads 104 are symmetrically arranged on a bottom surface 110 of body 102 about the orthogonal axes 105, 107 (shown in FIG. 5A) from the contact point of suspension arm 120 as shown in FIG. 5B. Burnishing surfaces 106 of burnishing pads 104 are parallel to bottom surface 110. The symmetrical arrangement of pads 104 on bottom surface 110 eliminates the need for aligning burnishing head 100 in a particular direction relative to a rotating disk. Also, because burnishing surfaces 106 are the air bearing surface, a symmetrical arrangement of burnishing pads 104 creates an equal amount of lift around the point of contact with suspension arm 120. Circular pads 104 are approximately 0.015 inches away from each other (distance C in FIG. 5A). Each pad 104 is approximately 0.012 inches in diameter (distance D in FIG. 5A), although this dimension is dependent upon the fly height requirements of burnishing head 100. In order to reduce the fly height of burnishing head 100, the total air bearing surface area, which is the area of all burnishing surfaces 106, can be reduced. Accordingly, when the fly height of burnishing head 100 is reduced, the diameter of pads 104 will be reduced.

Figure 6:
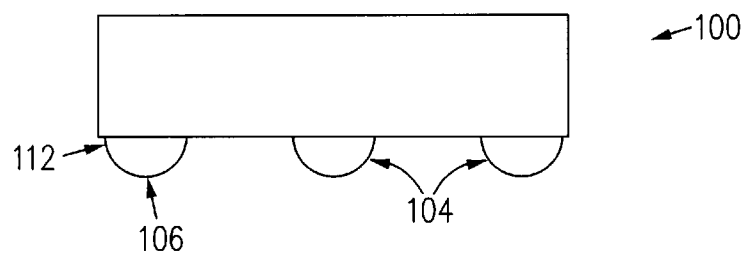
FIG. 6 is a side view of a burnishing head having dome shaped burnishing pads.

Circular pads 104 protrude from body 102 a minimum of approximately 0.0002 inches (distance E in FIG. 5B) if burnishing head 100 is ion milled, or a greater amount, such as 0.004 to 0.005 inches, if burnishing head 100 is manufactured by conventional machining. As illustrated in FIG. 5B, the junctions of burnishing surfaces 106 and the sides 112 of circular pads 104 are curved. In another embodiment, the junction between burnishing surfaces 106 and sides 112 has a large enough radius of curvature that burnishing pads 104 are substantially dome shaped, as shown in FIG. 6. Thus, circular pads 104 have no sharp cutting edges that may damage the surface of a memory disk. The junction of burnishing surfaces 106 and sides 112 may be rounded through ion milling or by diamond blending the pads 104 to remove the corners and sharp edges after manufacturing by convention milling.

Figure 7:
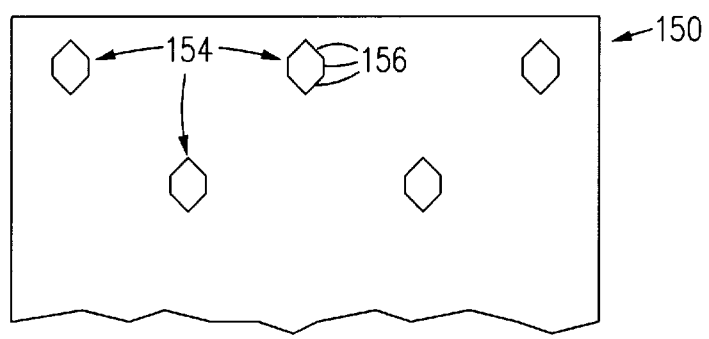
FIG. 7 is a partial bottom plan view of a burnishing head with burnishing pads having a polygonal geometry, such that there are at least five sides.

FIG. 7 illustrates another embodiment, in which burnishing head 150 has a plurality of burnishing pads 154 with a polygonal geometry such that there are at least four sides 156 of burnishing pads 154. Polygons with a greater number of sides, e.g. pentagons, hexagons or octagons, can also be used. In such an embodiment, the more sides 156 that burnishing pads 154 have, the closer the approximation to a circular burnishing pad.

Figure 8A:
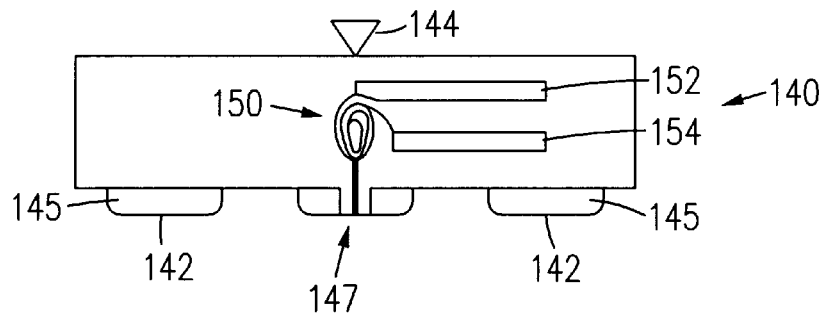
FIG. 8A is a side view of a slider for a read-write head with a symmetric air bearing surface in accordance with the invention.

Burnishing head 100 is manufactured without a tapered edge. Thus, there is no requirement that one particular edge be the leading edge. As illustrated in FIG. 8A, burnishing head 100 flies on an air bearing above the surface 114 of disk 116 in a level manner, e.g., with no slope angle. Burnishing head 100 flies parallel to disk 116 because there is no tapered edge, burnishing head 100 is symmetrically shaped, and the burnishing pads 104 are symmetrically arranged about the point of suspension. Of course, it is possible adjust the above factors to compensate for a deficiency in one or more of the above factors. Flying parallel to the disk allows burnishing head 100 to use all burnishing pads 104 simultaneously, which evenly distributes the wear on pads 104.

In one embodiment, when burnishing head 100 is first manufactured, due to manufacturing imperfections, initially it does not fly absolutely parallel to the disk, but with use and wear of the burnishing pads, it subsequently flies parallel to the disk. In another embodiment, burnishing head flies substantially parallel to the disk, i.e. at an angle between minus 30 seconds and plus thirty seconds with respect to the disk surface. In yet another embodiment, the burnishing head flies at an angle between minus 15 seconds and plus 15 seconds.

Figure 8B:
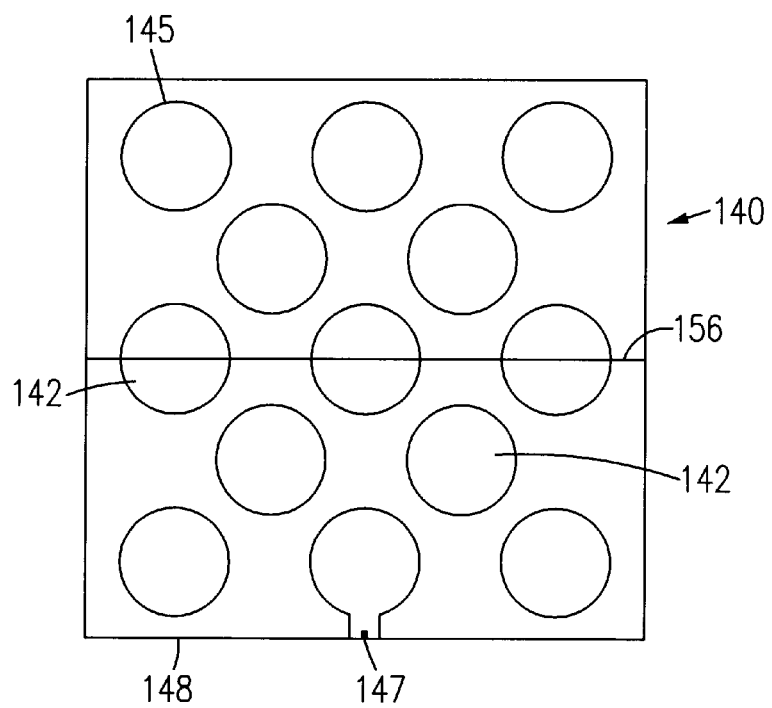
FIG. 8B is a plan view of the slider of FIG. 8A.

In accordance with our invention, heads other than burnishing heads (e.g. read-write heads) may also fly parallel to the surface of the disk. (Read-write heads are known in the art. See U.S. Pat. Nos. 3,855,625; 4,734,803; 4,894,740; and 5,128,822, incorporated herein by reference.) As shown in FIGS. 8A and 8B, a read-write head includes a slider 140 having a symmetrical arrangement of air bearing surfaces 142 about the point of support 144 with the suspension arm. Air bearing surfaces 142 are the bottom surfaces of a set of pads 145. A read-write element 147 is formed on an end 148 of slider 140. (Read-write element 147 need not be on the trailing end of slider 140, as is typical in conventional sliders.) Also shown in FIG. 8A is a coil 150 and wire pads 152, 154 for connecting read-write element 147 to appropriate read and write electronics. As can be seen, by providing a read-write element 147, the slider is no longer completely symmetrical about an axis 156. However, this small degree of assymetry does not appreciably affect the slider flying characteristics. Slider 140 has an untapered leading edge and may fly in a level manner.

Figure 2A:
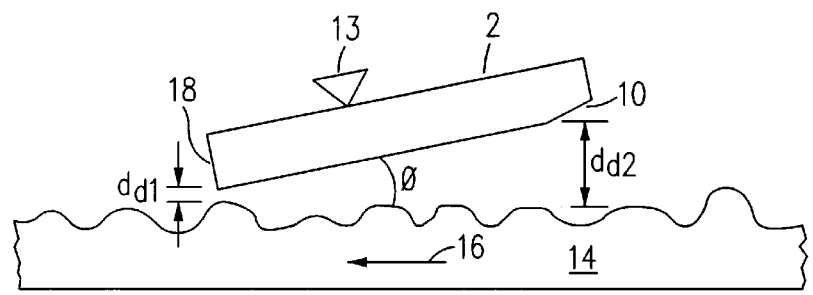
FIGS. 2A and 2B illustrate a side view of an unused diamond pad burnishing head and a worn diamond pad burnishing head, respectively, over the surface of a rotating memory disk.
Figure 2B:
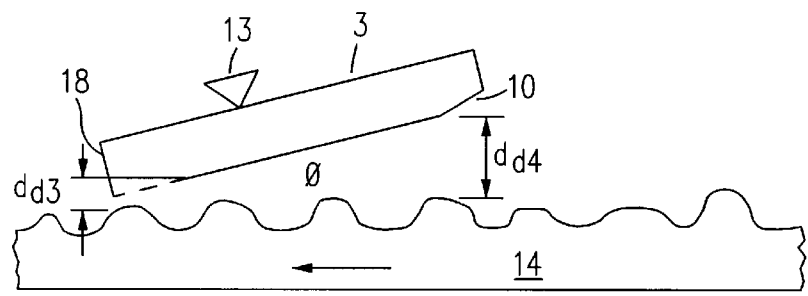
Figure 9A:
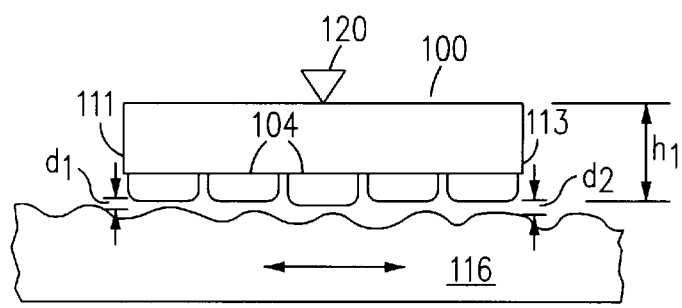
FIGS. 9A and 9B are side views of a burnishing head in accordance with the invention over the surface of a rotating memory disk.
Figure 9B:
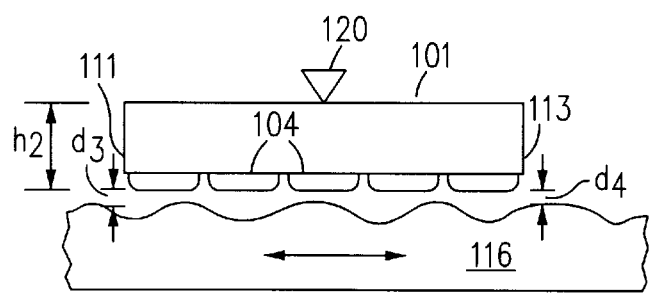

As FIG. 9A illustrates the distance $d_1$ from disk 116 to edge 111 of burnishing head 100 is equal to distance $d_2$ from disk 116 to edge 113 of burnishing head 100. As burnishing head 100 is used burnishing pads 104 will wear away in an even manner. Thus, as shown in FIG. 9B, a worn burnishing head 101 has a height $h_2$ less than height $h_1$ shown in FIG. 9A, because burnishing pads 104 have partially worn away. Nevertheless, worn burnishing head 102 still has a distance $d_3$ from disk 116 to edge 111 that is equal to distance $d_4$ from disk 116 to edge 113. Further, distance $d_3$ in FIG. 9B equals distance $d_1$ in FIG. 9A and likewise distance $d_4$ equals distance $d_2$. Thus, worn burnishing head 101 is as effective as unworn burnishing head 100. Further, because burnishing head 100 wears down pads 104 evenly, burnishing head 100 has increased durability. As illustrated in FIGS. 2A and 2B, a diamond pad burnishing head, on the other hand, wears down unevenly becoming less effective with use.

With no cutting edges, burnishing head 100 removes asperities and contamination through impact energy and pressure generated under burnishing surfaces 106. Impact energy is created when one of burnishing pads 104 contacts an asperity on disk surface 114, which is rotating at high speed, typically 1500 to 8000 r.p.m. The energy from the impact dislodges the asperity or contaminant from surface 114. The other method in which asperities or contaminants are removed is through pressure generated under burnishing surfaces 106. The pressure, which is force divided by area, generated under each burnishing surface may be very large. There is typically a downward force, or gram load, between 3.5 to 15 grams provided by suspension arm 120. The total area of circular burnishing surfaces 106, however, is very small as described by the following equation:

$$A = N \times \pi R^2 \qquad \text{(equ. 1)}$$

where A is the total burnishing surface area, N is the number of burnishing pads 104, and R is the radius of the burnishing surface 106 of each pad 104. Because the total burnishing area A is very small, the pressure generated under each burnishing surface 106 is very large. The large pressure under each pad 104, when encountered by an asperity or contaminant, propels the asperity or contaminant from surface 114. The actual parameters (rotational velocity, gram loading, radius of burnishing pads, and flying height), however, depend on the specific requirements for the type of disk being burnished.

Figure 1:
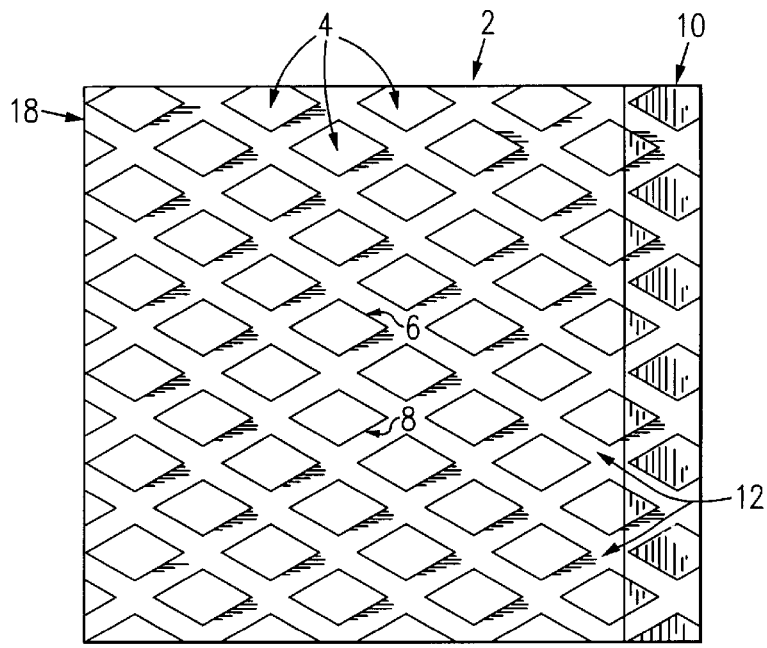
FIG. 1 illustrates in plan view the bottom surface of a diamond pad burnishing head.

Once a defect such as an asperity or contamination is removed from the surface of the disk, the debris is swept past pads 104. Because pads 104 are approximately 0.015 inches apart, residue created in the burnishing head manufacturing process can be removed easily. Therefore, unlike the diamond pad burnishing head 2 of FIG. 1, manufacturing residue will not interfere with asperity debris being swept away during use of burnishing head 100. In addition, the use of circular burnishing pads 104 minimizes any interference with or reflection of the air current flowing between pads 104 because there are no straight surfaces. Thus, there is a steady air flow between burnishing pads 104 to sweep debris away. In addition, circular burnishing pads 104 prevent debris accumulation along the sides of pads 104.

Figure 3A:
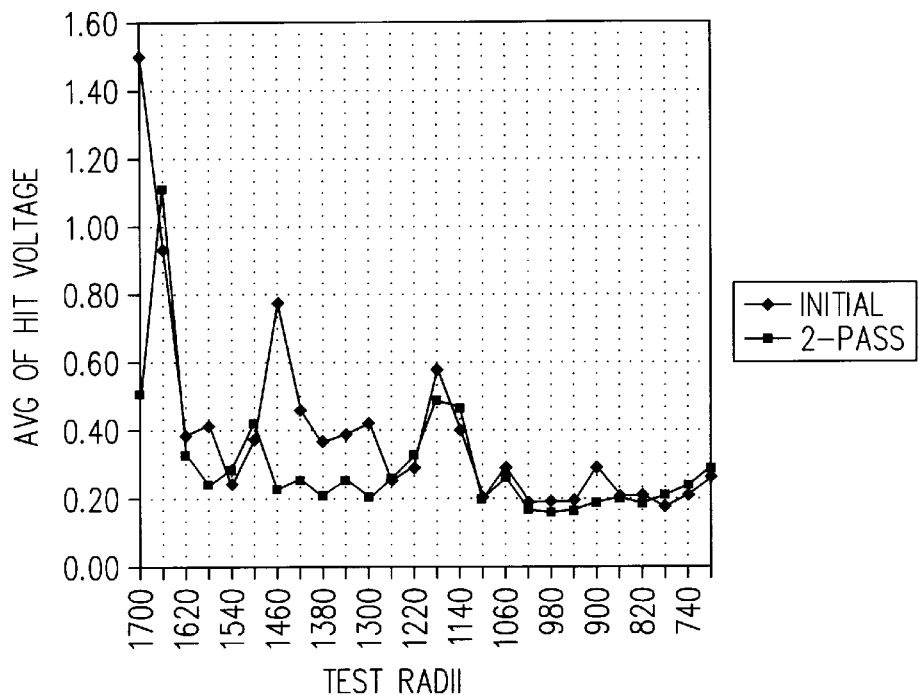
FIGS. 3A and 3B are graphs of the performance of an unused diamond pad burnishing head and the same burnishing head after it had been used for eight hours.
Figure 3B:
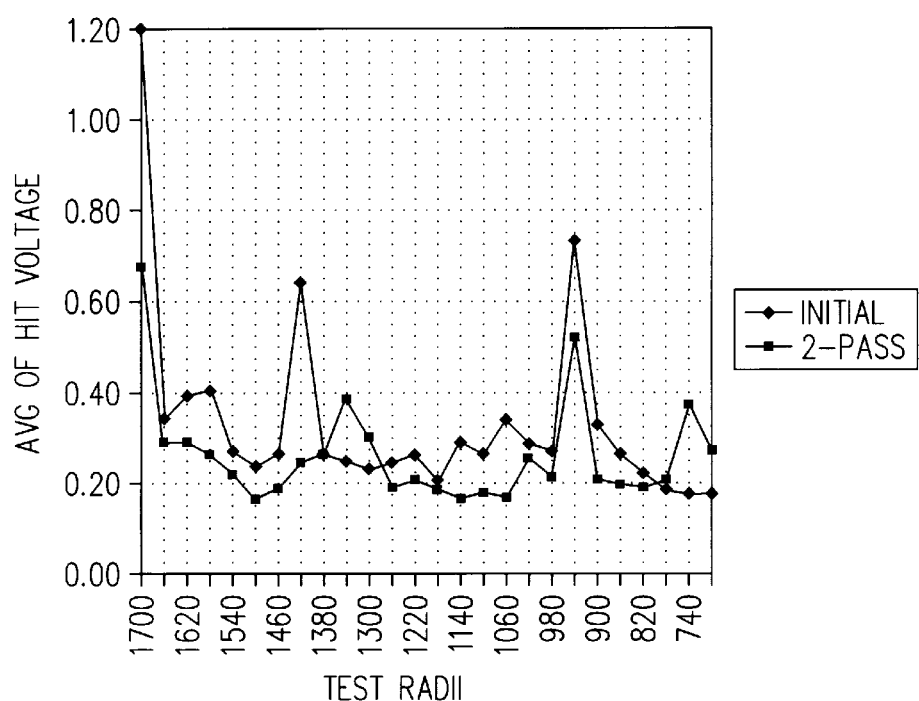
Figure 4A:
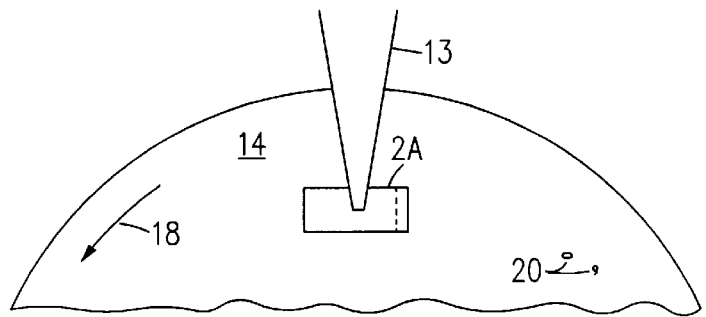
FIGS. 4A and 4B illustrate in plan view a transverse diamond pad burnishing head and an in-line diamond pad burnishing head, respectively.
Figure 4B:
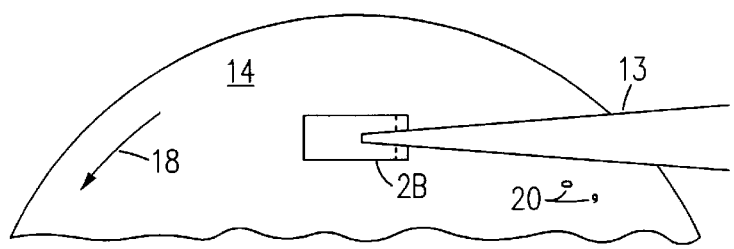
Figure 10A:
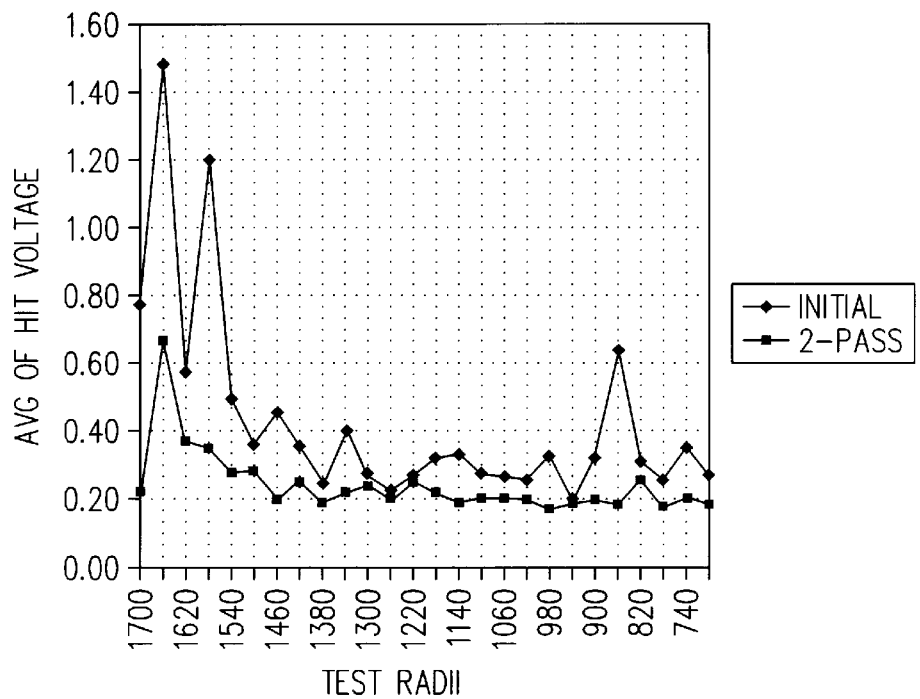
FIGS. 10A and 10B are graphs of the performance of an unused 13 circular pad burnishing head and the same burnishing head after it had been used for eight hours.
Figure 10B:
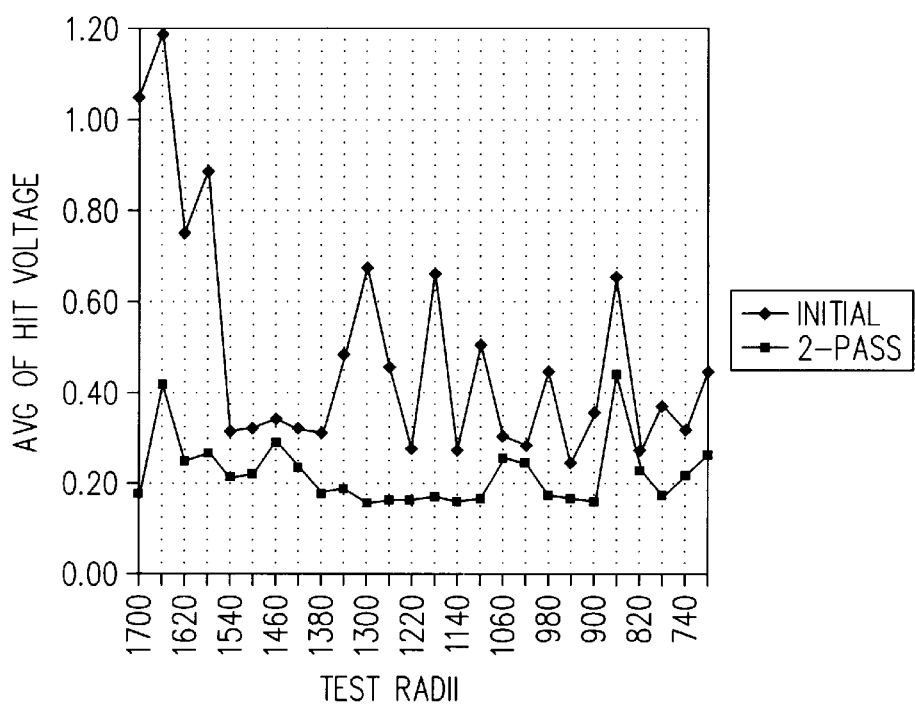

FIG. 10A is a graph showing the performance of an unused 13 circular pad burnishing head. As in FIGS. 3A and 3B, the vertical axis is the average hit voltage determined by a glider head. The horizontal axis is the test radii of the disks tested. The line with diamond data points is the average hit voltages of five disks before burnishing. The line with square data points represents the average hit voltage of the same five disks after two passes with a 13 circular burnishing head. FIG. 10B is a graph similarly depicting the performance of the same burnishing head after eight hours of continuous use. FIG. 10B also depicts the initial average hit voltages of five unburnished disk and the average hit voltages on the same disks after two passes with the used 13 circular pad burnishing head. FIG. 10B shows that the used 13 circular pad burnishing head effectively burnished the disks without causing damage.

Burnishing head 100 is made of material that is substantially harder than the magnetic or magneto-optic disk on which it is to be used. An appropriate material is aluminum oxide-titanium carbide such as material type no. 210 available from 3M Corporation located in Minnesota. Circular pads 104 may be ion milled from the aluminum oxide-titanium carbide body of the burnishing head in a conventional manner. Alternatively, burnishing pads 104 may be conventionally machined out of a aluminum oxide-titanium carbide body, and diamond blended to remove the corners and sharp edges of pads 104. With a symmetric array of circular pads 104 and no tapered edge on body 102, burnishing head 100 is a universal burnishing head. Accordingly, burnishing head 100 is easy to manufacture and install because there is no need to determine which direction burnishing head 100 must face relative to the surface 114 of disk 116.

Figure 11:
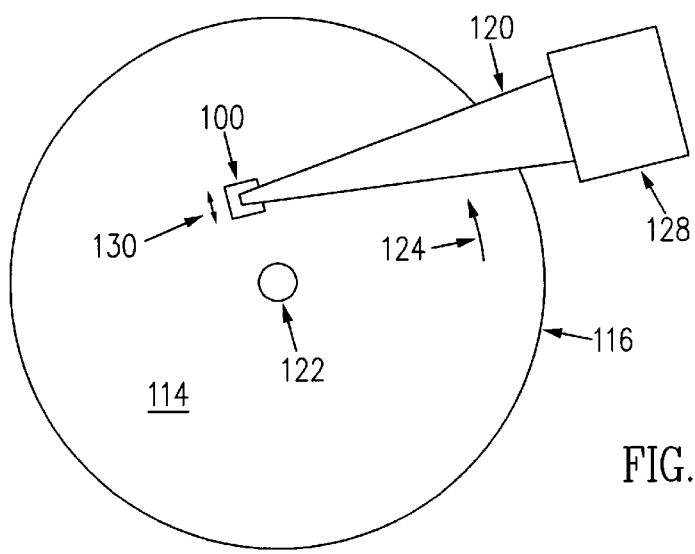
FIG. 11 illustrates in plan view a burnishing head connected to a suspension arm over the rotating surface of a magnetic disk.

As illustrated in FIG. 5B, upper surface 108 of body 102 is connected to suspension arm 120. An appropriate suspension arm is the type 2 model available from Magnecom, Inc., located in San Diego. As illustrated in FIG. 11, memory disk 116 is placed on a spindle 122 rotated by a motor (not shown) at a high speed in the direction of arrow 124. As memory disk 116 rotates relative to burnishing head 100, an actuator 128 connected to suspension arm 120 moves burnishing head 100 inwardly and outwardly over surface 114 of disk 116 as indicated by arrow 130. In this way burnishing head 100 burnishes substantially the entire surface 116 of magnetic disk 118.

Figure 12:
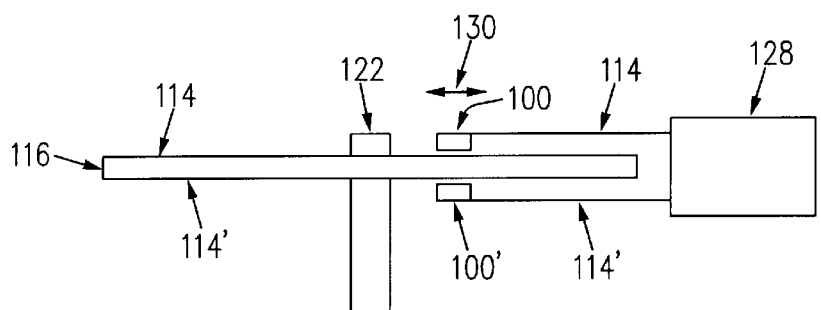
FIG. 12 is a side view of a pair of burnishing heads in contact with the top and bottom surfaces of a magnetic disk.

As illustrated in FIG. 12, disk 116 has a top surface 114 and a bottom surface 114'. Burnishing heads 100 and 100' are connected to suspension arms 120 and 120' which maintain the position of burnishing heads 100 and 100' relative to surfaces 114 and 114', respectively. Actuator 128 moves both suspension arms 114 and 114' simultaneously in the direction of arrows 130. Thus, both surfaces 114 and 114' may be simultaneously burnished by burnishing heads 100 and 100'.

Figure 13:
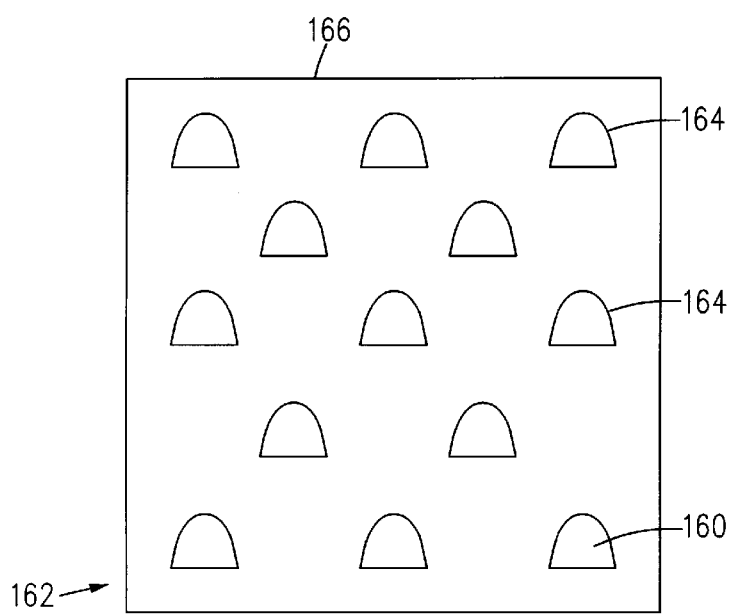
FIG. 13 shows a plan view of a slider including burnishing pads shaped in a semi-circle.

Although the present invention is illustrated in connection with specific embodiments for instructional purposes, the present invention is not limited thereto. Various adaptations and modifications may be made without departing from the scope of the invention. For example, the burnishing head may be made from materials other than aluminum oxide-titanium carbide. Such material should be sufficiently hard to remove asperities. The burnishing head may be coated with a carbide by sputtering or other similar techniques to increase the durability of the burnishing head. Further, different sizes, shapes, and symmetrical arrangements of burnishing pads may be used and different sizes and dimensions of burnishing heads may be used. In addition, instead of using circular burnishing pad, other curved shapes can be used, such as ellipses, parabolas, or other similar shapes. In other embodiments, only the leading sides of the pads need to be curved, thus, the pads may be semi-circular, for example. (See pads 160 of burnishing head 162 in FIG. 13. Semi-circular sides 164 of pads 160 face the leading end 166 of head 162. Thus, in this embodiment, some symmetry has been sacrificed.) As mentioned above, the pads may also be polygons. (In addition, it should be noted that polygonal pads having sufficiently numerous sides are equivalent to pads having curved sides.) Accordingly, all such changes come within our invention.

What is claimed is:

1. A burnishing head for burnishing a disk, said burnishing head comprising:
    a body with a bottom surface; and
    a plurality of burnishing pads on said bottom surface, wherein said burnishing pads each have a curved side;
    wherein said burnishing head flies over a surface of said disk.

2. The burnishing head of claim 1, wherein said burnishing pads have at least one side downwardly extending from said bottom surface.

3. The burnishing head of claim 2, wherein said side is curved to define a circle.

4. The burnishing head of claim 2, wherein a leading side of said burnishing pads has a curved geometry and a trailing side of said burnishing pad is straight.

5. The burnishing head of claim 2, wherein said burnishing pads have a burnishing surface, said burnishing surface being parallel to said bottom surface of said body.

6. The burnishing head of claim 5, wherein said burnishing pads have a junction between said burnishing surface and said side, said junction being curved.

7. The burnishing head of claim 1, wherein said burnishing pads are dome shaped.

8. The burnishing head of claim 1 wherein said burnishing pads are arranged in a symmetrical pattern on said bottom surface.

9. The burnishing head of claim 1, wherein there are thirteen said burnishing pads.

10. The burnishing head of claim 1, wherein there are eight said burnishing pads.

11. The burnishing head of claim 1, wherein there are four said burnishing pads.

12. The burnishing head of claim 1, wherein said body is square.

13. The burnishing head of claim 1, wherein said bottom surface has a leading edge, wherein said leading edge does not have a taper.

14. The burnishing head of claim 1, wherein said bottom surface is an air bearing surface.

15. A burnishing head comprising:
    a body with a bottom surface; and
    a plurality of burnishing pads on said bottom surface, wherein said burnishing pads have at least four sides forming a polygonal geometry, wherein said burnishing head does not have a tapered leading edge and flies substantially parallel to a disk that said burnishing head is burnishing.

16. The burnishing head of claim 15, wherein said burnishing pads have a burnishing surface, said burnishing surface being parallel to said bottom surface of said body.

17. The burnishing head of claim 16, wherein said burnishing pads have a junction between said burnishing surface and said sides, said junction being curved.

18. The burnishing head of claim 15 wherein said burnishing pads are arranged in a symmetrical pattern on said bottom surface.

19. A structure comprising:
   a slider having an untapered leading edge and a point of contact with a suspension arm; and
   an air bearing surface that is symmetrical about orthogonal axes from said point of contact with said suspension arm.

20. A method for burnishing a surface of a memory disk comprising the steps of:
   providing a burnishing head with a bottom surface and a plurality of burnishing pads on said bottom surface, wherein said burnishing pads have a curved geometry;
   rotating said memory disk relative to said burnishing head such that an air bearing forms over the surface of said memory disk;
   supporting said burnishing head on said air bearing over said surface of said memory disk; and
   moving said burnishing head transversely over said surface of said memory disk so as to burnish said surface of said memory disk.

21. A method for burnishing a surface of a memory disk comprising the steps of:
   providing a burnishing head with a bottom surface and a plurality of burnishing pads on said bottom surface, wherein said burnishing pads have at least five sides forming a polygonal geometry;
   rotating said memory disk relative to said burnishing head such that an air bearing forms over the surface of said memory disk;
   supporting said burnishing head on said air bearing over said surface of said memory disk; and
   moving said burnishing head transversely over said surface of said memory disk so as to burnish said surface of said memory disk.

* * * * *